United States Patent

Sugiyama et al.

[11] Patent Number: 6,087,042
[45] Date of Patent: Jul. 11, 2000

[54] POSITIVE ELECTRODE MATERIAL FOR SECONDARY LITHIUM BATTERY

[75] Inventors: Jun Sugiyama; Tsuyoshi Sasaki; Tatsuya Hatanaka; Tatsuo Noritake; Tatsumi Hioki, all of Aichi, Japan

[73] Assignee: Kabushiki Kaisha Toyota Chuo Kenkyusho, Aichi-gun, Japan

[21] Appl. No.: 09/255,704

[22] Filed: Feb. 23, 1999

Related U.S. Application Data

[63] Continuation-in-part of application No. 08/954,120, Oct. 20, 1997, abandoned.

[30] Foreign Application Priority Data

Oct. 18, 1996 [JP] Japan .................................. 8-297422
Oct. 1, 1997 [JP] Japan .................................. 9-286150

[51] Int. Cl.$^7$ ...................................... H01M 4/50
[52] U.S. Cl. ................ 429/224; 429/231.95; 423/464; 423/599; 423/641
[58] Field of Search .................... 423/464, 599, 423/641; 429/224, 231.95

[56] References Cited

U.S. PATENT DOCUMENTS 5,674,645  10/1997  Amatucci et al. ..................... 429/224
5,759,720   6/1998  Amatucci ............................. 429/224
5,932,374   8/1999  Amatucci ............................. 429/224

*Primary Examiner*—Bruce F. Bell
*Attorney, Agent, or Firm*—Oblon, Spivak, McClelland, Maier & Neustadt, P.C.

[57] ABSTRACT

Disclosed is a positive electrode material for a secondary lithium battery excellent in high temperature cycle characteristics which is a lithium manganese oxyfluoride having a spinel structure, wherein the oxyfluoride has a composition represented by the composition formula:

$$Li_{1+x}Mn_{2-x}O_{4-y}F_z$$

wherein x represents a number of from 0.0133 to 0.3333; y represents a number of from 0 to 0.2 (exclusive of 0); and z represents a number of from 0.01 to 0.2 (exclusive of 0.01), with the proviso that (y−z) is more than 0 but not more than 0.07. The positive electrode material for a secondary lithium battery of the present invention exhibits not only a high cycle durability of charge/discharge but also a minimum drop of a charge/discharge initial capacity to provide a high energy density.

12 Claims, 10 Drawing Sheets

POSITIVE ELECTRODE MATERIAL FOR SECONDARY LITHIUM BATTERY

This application is a continuation in part of application Ser. No. 08/954,120 filed on Oct. 20, 1997, now abandoned.

FIELD OF THE INVENTION

The present invention relates to a positive electrode material for a secondary lithium battery excellent in high temperature cycle characteristics. More particularly, the present invention relates to a positive electrode material for a secondary lithium battery excellent in high temperature cycle characteristics which is a lithium-manganese oxyfluoride having a spinel structure.

BACKGROUND OF THE INVENTION

In recent years, secondary lithium batteries have been noted because of their advantages, i.e., high charge-discharge voltage and large charge-discharge capacity. Since the secondary lithium batteries have a high energy density that allows the reduction of the size and weight thereof, they have been used in personal computers and communication business apparatus such as a portable telephone and can be expected to be used as a power supply for electric automobiles, etc. in the near future.

As the positive electrode material for secondary lithium batteries there have been considered promising lithium manganate ($LiMn_2O_4$) which is a lithium-manganese oxide having a spinel structure instead of lithium cobaltate ($LiCoO_2$), which had heretofore been used.

Particularly noted among the Li-Mn-O system are those obtained by replacing the Mn site of $LiMn_2O_4$ with an extremely small amount of Li ions as represented by the composition formula $Li_{1+x}Mn_{2-x}O_4$ (in which x represents a number of from more than 0 to less than 0.03) because of improved cycle durability of charge/discharge (Y. Gao and J. R. Dahn, *J. Electrochem. Soc.*, 143, 100, 1996). The improvement in cycle durability is attributable to the reduction of crystal lattice distortion accompanied with charge/discharge, i.e., elimination/insertion of Li ions.

On the other hand, JP-A-7-254403 (The term "JP-A" as used herein means an "unexamined published Japanese patent application") discloses compounds obtained by partially substituting fluorine (F) for oxygen in $LiMn_2O_4$ compound. is These compounds are represented by the composition formula $Li_xMn_2O_{4-a}F_b$ (in which x represents a number of from more than 0 to not more than 1.02; a represents a number of not more than 0.05; and b represents a number of from not less than 0.01 to less than 0.1). These compounds are intended to inhibit self-discharging during charging, making it possible to secure discharge capacity, particularly under high temperature conditions.

However, the former compound, i.e., $Li_{1+x}Mn_{2-x}O_4$ as a spinel structure having a slight excess of Li has a serious disadvantage that it has a reduced discharge capacity. For the stoichiometric $LiMn_2O_4$ spinel, the distribution of cations is represented by (Li)[$Mn_2$]$O_4$, where ( ) shows the tetrahedral site or the A-site and [ ] the octahedral site or the B-site respectively. So, the distribution of the cations in a $Li_{1+x}Mn_{2-x}O_4$ spinel can be represented by (Li)[$Li_xMn_{2-x}$]$O_4$; that is, Mn ions at the B-site are partially substituted with Li ions. From now on, we will call the Li ions at the B-site as the excess Li ions; and the amount of the excess Li ions are given by x.

As x increases, the average valence of Mn ions in $Li_{1+x}Mn_{2-x}O_4$ increases from 3.5 for $LiMn_2O_4$ with the increase of x. The charge/discharge capacity for $Li_{1+x}Mn_{2-x}O_4$ depends on the amount of Li ions, which are intercalated reversibly into $Li_{1+x}Mn_{2-x}O_4$. In particular, the capacity at around 4V with respect to Li metal is generated by a redox reaction between $Mn^{3+}$ and $Mn^{4+}$. Therefore, the increase in the average valence of Mn ions leads to a decrease in the charge/discharge capacity of the battery.

The relationship between the amount of excess Li and the theoretical capacity (mAh/g) is shown in FIG. 1. Referring to $Li_{1+x}Mn_{2-x}O_4$ sample (material c) in FIG. 1, it can be seen that as the amount x of excess Li increases, the theoretical capacity decreases linearly. When the amount x of excess Li is 0.03, the theoretical capacity of $Li_{1+x}Mn_{2-x}O_4$ sample is about 92% of that of the sample when x is 0.

This capacity drop has heretofore been permitted for the improvement of durability. However, this capacity drop impairs the advantage-of secondary lithium battery, i.e., high energy density. This is a serious problem from the standpoint of application to power supply for portable electronic apparatus or electric automobile.

On the other hand, the latter compound, i.e., $Li_xMn_2O_{4-a}F_b$, which is obtained by partially substituting fluorine for oxygen has no Li substituted for the Mn site. Therefore, this material is not liable to drop of initial charge/discharge capacity. However, this material is disadvantageous in that the discharge capacity is drastically reduced in repeating a charge/discharge cycle. Furthermore, it is considered difficult in ordinary solid phase reaction process to substitute fluorine for oxygen in a spinel structure.

SUMMARY OF THE INVENTION

An object of the present invention is to provide a positive electrode material for a secondary lithium battery which not only exhibits a desired cycle durability of charge/discharge but also inhibits the drop of charge/discharge capacity to maintain a high energy density.

In order to accomplish the foregoing object of the present invention, the present invention provides a positive electrode material for a secondary lithium battery excellent in high temperature cycle characteristics, comprising a spinel structure of a lithium manganese oxyfluoride having the formula:

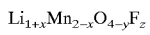

wherein x represents a number of from 0.0133 to 0.3333; y represents a number of from 0 to 0.2 (exclusive of 0); and z represents a number of from 0.01 to 0.2 (exclusive of 0.01), with the proviso that (y−z) is more than 0 but not more than 0.07.

In the present invention, it is more preferable that (y−z) is from 0.005 to 0.06, particularly from 0.01 to 0.04 or x is not less than 0.03. When oxygen atoms are partially eliminated or replaced by fluorine atoms in a proper amount, the long distance interaction between Mn ions with intervening oxygen is remarkably weakened. This makes it possible to provide a positive electrode material for a secondary lithium battery which shows little or no change in its crystal structure even with repetition of charge/discharge and thus can exhibit a better durability.

The lithium manganese oxyfluoride of the present invention is produced by introducing F and Li of LiF into the Mn site of lithium manganate. This material is preferable for a positive electrode of lithium batteries which is further constituted of a carbon negative electrode and a nonaqueous electrolyte.

DETAILED DESCRIPTION OF THE INVENTION

In order to inhibit the increase of the valence of manganese ion in the foregoing composition $Li_{1+x}Mn_{2-x}O_{4-y}F_z$ by excess lithium, the following possible approaches may be used:

A) To eliminate oxygen atoms (when z is 0);
B) To substitute fluorine atoms for oxygen atoms (when y equals z); and
C) To partially substitute fluorine atoms for oxygen atoms and eliminate the remaining oxygen atoms (when z is less than y).

However, if the loss of oxygen atoms is excessive in the approach (A), the resulting spinel structure is unstable, further deteriorating the cycle durability of charge/discharge. Thus, as in the approaches B) and C), it is preferred that the deficiency of oxygen atoms be partially or entirely replaced with fluorine atoms.

Figure 1:
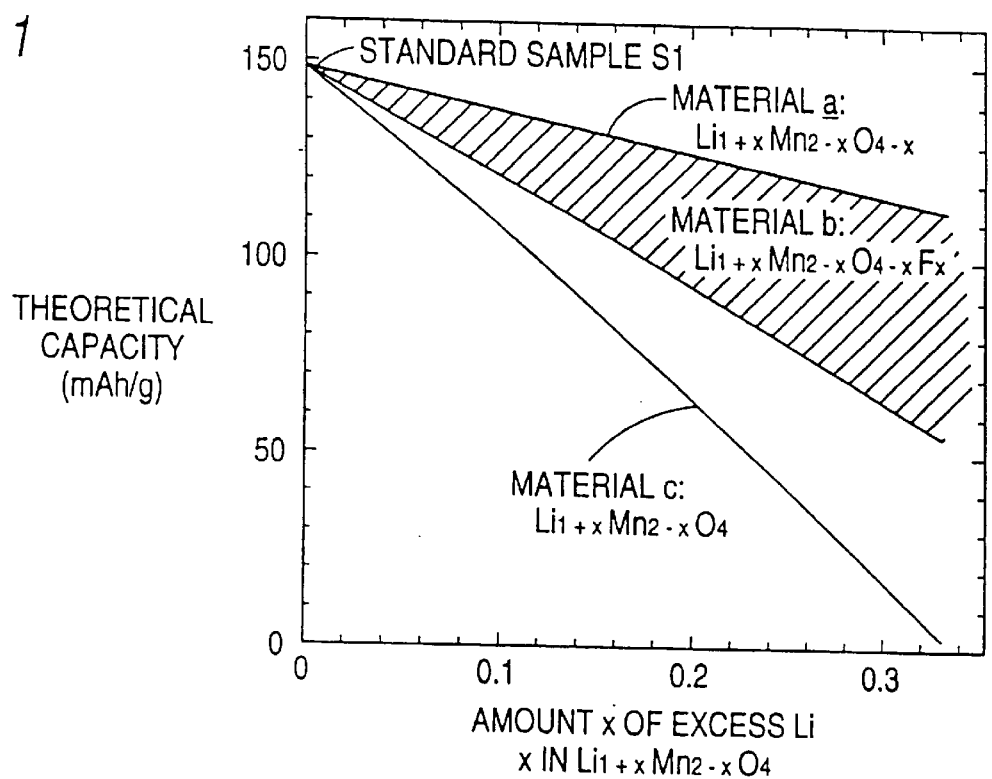
FIG. 1 is a graph illustrating the relationship between the theoretical capacity and the amount x of excess Li in the comparison of $Li_{1+x}Mn_{2-x}O_{4-y}F_z$ material of the present invention with the conventional $Li_{1+x}Mn_{2-x}O_4$ material, etc.

Referring to the relationship between the amount x of excess Li and the theoretical capacity (mAh/g) as shown in FIG. 1, the foregoing approach A) is represented by the straight line for the material a: $Li_{1+x}Mn_{2-x}O_{4-x}$. The foregoing approach B) is represented by the straight line for the material b: $Li_{1+x}Mn_{2-x}O_{4-x}F_x$. The foregoing approach C) is represented by the shade between the straight line for the material a and the straight line for the material b.

The relationship between the theoretical capacity $C_{theo}$ (mAh/g) and the amount x of excess Li is given by the following equations. In the following equations, mw (x) represents the molecular weight of sample, and F represents the Faraday constant ($9.6485 \times 10^4$ C/mol).

$$Li_{1+x}Mn_{2-x}O_{4-x}: C_{theo} = (1-x)\frac{F}{mw(x)}\frac{1000}{3600} \qquad \text{(Material a)}$$

$$Li_{1+x}Mn_{2-x}O_{4-x}F_x: C_{theo} = (1-2x)\frac{F}{mw(x)}\frac{1000}{3600} \qquad \text{(Material b)}$$

$$Li_{1+x}Mn_{2-x}O_4: C_{theo} = (1-3x)\frac{F}{mw(x)}\frac{1000}{3600} \qquad \text{(Material c)}$$

As can be seen in the foregoing theoretical equations, $Li_{1+x}Mn_{2-x}O_{4-x}F_x$ sample can reduce its capacity drop to about ⅓ of that of $Li_{1+x}Mn_{2-x}O_4$ at maximum. Therefore, the positive electrode material according to the present invention has a high capacity almost as the conventional positive electrode materials. Further, the positive electrode material according to the present invention exhibits a drastically improved durability as compared with $LiMn_2O_4$ positive electrode.

The range of the amount x of excess Li in $Li_{1+x}Mn_{2-x}O_{4-y}F_z$ will be described hereinafter. The relationship between the capacity C(n) at nth cycle and the initial capacity $C_0$ in a durability test is represented by the following equation:

$$C(n) = C_0 \alpha^n$$

wherein α is the capacity retention per cycle. Conversely speaking, this equation shows that the capacity retention α per cycle must be 0.9949 to maintain 60% of the initial capacity after 100 cycle repetition of charge/discharge. The relationship between α and x with respect to $Li_{1+x}Mn_{2-x}O_4$ is shown in FIG. 2.

Figure 2:
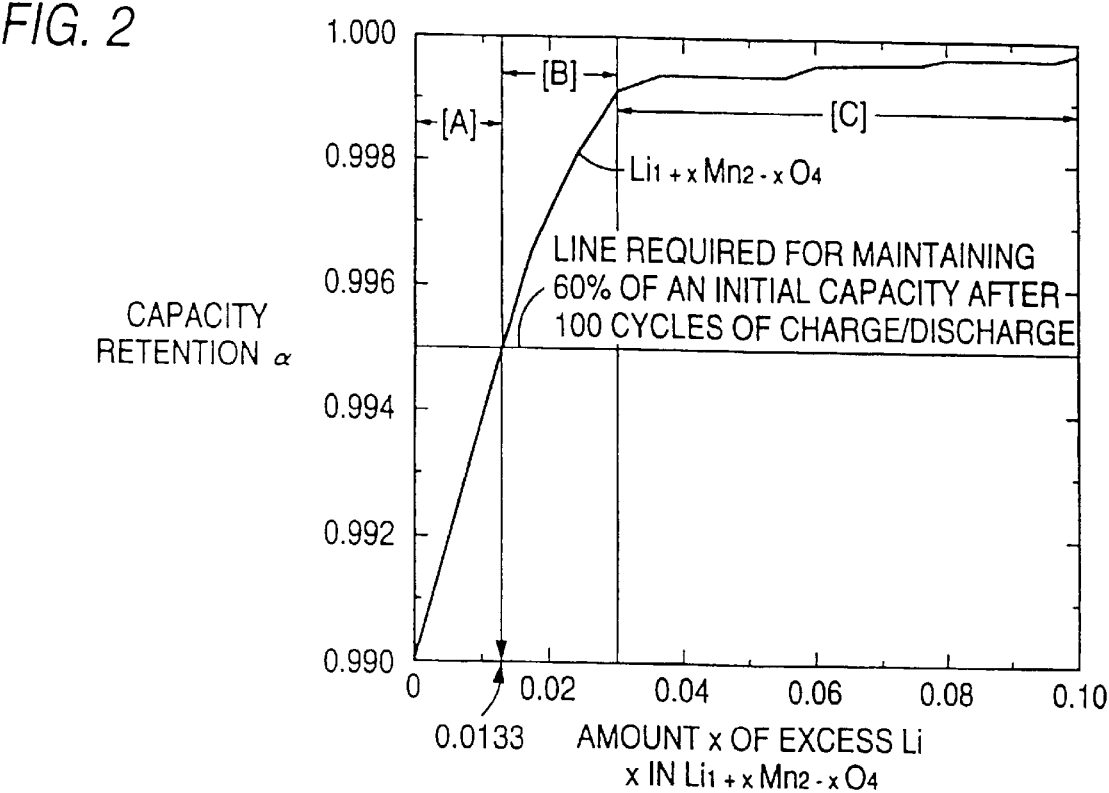
FIG. 2 is a graph illustrating the relationship between the capacity retention per cycle of charge/discharge and the amount x of excess Li with respect to $Li_{1+x}Mn_{2-x}O_4$ material shown in FIG. 1.

In FIG. 2, as the amount x of excess Li increases, the capacity retention α increases. In order to maintain a practically necessary durability, x must be not less than 0.0133, preferably not less than 0.03. Almost the same relationship as mentioned above is observed for $Li_{1+x}Mn_{2-x}O_{4-y}F_z$.

On the other hand, when x reaches 0.3333, all Mn ions in $Li_{1+x}Mn_{2-x}O_4$ have a valence of +4. Even if Li is introduced further excessively, no samples can be synthesized. In other words, in the region [A] in FIG. 2, repetition of cycles of charge/discharge causes a drastic capacity drop, making it difficult to put the product into practical use. In the region [B], the initial capacity drops to about 96% of that of pure sample, but the capacity can be maintained until 100 to 300 cycles. In the region [C], a positive electrode shows stable characteristics over a period of time as long as not less than 300 cycles regardless of an initial capacity drop to not more than 96% from an initial capacity of pure sample. The present invention corresponds to the regions [B] and [C] in FIG. 2.

The product disclosed in the above cited JP-A-7-254403 is one represented by $Li_{1+x}Mn_{2-x}O_{4-y}F_z$ wherein x is from not less than 0 to not more than 0.0132 (corresponding the region [A] in FIG. 2). It is obvious that when x falls within this region, the amount of excess Li is too low to provide a sufficient improvement in durability.

Further, when oxygen atoms are partially eliminated or replaced by fluorine atoms in a proper amount, the long distance interaction between Mn ions with intervening oxygen is remarkably weakened. This makes it possible to provide a positive electrode material for a secondary lithium battery which shows little or no change in its crystal structure even with repetition of charge/discharge and thus can exhibit a better durability.

In the foregoing composition formula $Li_{1+x}Mn_{2-x}O_{4-y}F_z$, when y ranges from more than 0 to not more than 0.2, z ranges from not less than 0.01 to not more than 0.2. If z falls below 0.01, the resulting effect exerted by substitution of F is not sufficient. On the contrary, if z exceeds 0.2, the excess fluorine doesn't substitute for oxygen. As a result, LiF remains as an impurity.

$Li_{1+x}Mn_{2-x}O_{4-y}F_z$ preferably has a cubic spinel structure. As the eliminated amount (y–z) of oxygen increases, the crystal structure changes from cubic to tetragonal symmetry in the vicinity of 0.07 for y–z. This structure change reduces the reversible voltage of the material. Accordingly, in order to maintain the desired cubic spinel structure regardless of introduction of oxygen, (y–z) is preferably less than 0.07.

The present invention will be further described in the following examples.

Firstly, the synthesis of the material represented by the composition formula $Li_{1+x}Mn_{2-x}O_{4-y}F_z$ will be described. Before the synthesis of this material, $LiMn_2O_4$ may be synthesized. As starting materials there were used lithium carbonate ($Li_2CO_3$) and manganese dioxide ($MnO_2$) in powder form. In some detail, 3.505 g of $Li_2CO_3$ and 16.495 g of $MnO_2$ were then mixed with ethanol as a solvent by using a planetary ball mill. The mixed powder was dried, pelletized, and then calcined at 700° C. for 8 hours in the stationary ambient atmosphere three times. This pelletized product was then thoroughly ground to obtain $LiMn_2O_4$ material.

Subsequently, to 24.689 g of powdered $LiMn_2O_4$ material were added 0.182 g of lithium fluoride (LiF) and 0.129 g of lithium carbonate ($Li_2CO_3$). The mixture was then thoroughly stirred. This mixed powder was press-molded into pellets which were then heat-treated at a temperature of 650° C. in a stream of oxygen for 12 hours. The material was then allowed to cool to room temperature in the furnace. The elementary analysis of this sample showed that this sample is represented by the composition formula $Li_{1.05}Mn_{1.95}O_{3.95}F_{0.05}$. This sample will be hereinafter referred to as "Sample 1 of the present invention".

Similar methods were effected to obtain $Li_{1.02}Mn_{1.98}O_{3.98}F_{0.02}$ (Sample 2 of the present invention), $Li_{1.1}Mn_{1.9}O_{3.9}F_{0.1}$ (Sample 3 of the present invention), $Li_{1.15}Mn_{1.85}O_{3.85}F_{0.15}$ (Sample 4 of the present invention), $Li_{1.2}Mn_{1.8}O_{3.8}F_{0.2}$ (Sample 5 of the present invention), $Li_{1.05}Mn_{1.95}O_{3.96}F_{0.04}$ (Sample 6 of the present invention), $L_{1.05}Mn_{1.95}O_{3.97}F_{0.03}$ (Sample 7 of the present invention) and $Li_{1.05}Mn_{1.95}O_{3.99}F_{0.01}$ (Sample 8 of the present invention).

The procedure of Sample 1 of the present invention was followed except that the molded mixed powder was quenched from 650° C. in an atmosphere of 20% $O_2$—Ar gas mixture flow. As a result, $Li_{1.05}Mn_{1.95}O_{3.95}F_{0.04}$ (Sample 9 of the present invention) was obtained. The procedure of Sample 7 of the present invention was followed except that the molded mixed powder was quenched from 650° C. in an atmosphere of 15% $O_2$—Ar gas mixture flow. As a result, $Li_{1.05}Mn_{1.95}O_{3.95}F_{0.03}$ (Sample 10 of the present invention) was obtained. The procedure of Sample 8 of the present invention was followed except that the molded mixed powder was quenched from 650° C. in an atmosphere of 10% $O_2$—Ar gas mixture flow. As a result, $Li_{1.05}Mn_{1.95}O_{3.95}F_{0.01}$ (Sample 11 of the present invention) was obtained.

Comparative samples were synthesized by the following method. In some detail, Comparative Sample C1 ($Li_{1.05}Mn_{1.95}O_4$) was obtained by a process which comprises adding 0.387 g of lithium carbonate ($Li_2CO_3$) to 24.613 g of $LiMn_2O_4$ powder, thoroughly stirring the mixture, heating the mixture at a temperature of 650° C. in a stream of oxygen for 12 hours, and then allowing the mixture to cool to room temperature in the furnace. This sample was quenched from 650° C. in an atmosphere of 10% $O_2$—Ar gas mixture flow to obtain $Li_{1.05}Mn_{1.95}O_{3.95}$ (Comparative Sample C2).

Further, the procedure of Sample 1 of the present invention was followed except that the molded mixed powder was quenched from 600° C. in an atmosphere of 17% $O_2$—Ar gas mixture flow. As a result, $Li_{1.05}Mn_{1.95}O_{3.94}F_{0.05}$ (Sample 12 of the present invention) was obtained. The procedure of Sample 1 of the present invention was followed except that the molded mixed powder was quenched from 600° C. in an atmosphere of 15% $O_2$—Ar gas mixture flow. As a result, $Li_{1.05}Mn_{1.95}O_{3.93}F_{0.05}$ (Sample 13 of the present invention) was obtained. The procedure of Sample 1 of the present invention was followed except that the molded mixed powder was quenched from 600° C. in an atmosphere of 10% $O_2$—Ar gas mixture flow. As a result, $Li_{1.05}Mn_{1.95}O_{3.91}F_{0.05}$ (Sample 14 of the present invention) was obtained. The procedure of Sample 1 of the present invention was followed except that the molded mixed powder was quenched from 600° C. in an atmosphere of 7% $O_2$—Ar gas mixture flow. As a result, $Li_{1.05}Mn_{1.95}O_{3.89}F_{0.05}$ (Sample 15 of the present invention) was obtained. The procedure of Sample 1 of the present invention was followed except that the molded mixed powder was quenched from 600° C. in an atmosphere of 5% $O_2$—Ar gas mixture flow. As a result, $Li_{1.05}Mn_{1.95}O_{3.88}F_{0.05}$ (Sample 16 of the present invention) was obtained.

The composition of Samples 1 to 16 of the present invention and Comparative Samples C1 and C2 and the amount of various starting materials required for the synthesis of these samples are set forth in Table 1.

TABLE 1

| | | Compound amount of starting material | | |
|---|---|---|---|---|
| Sample No. | Composition | $LiMn_2O_4$ | LiF | $Li_2CO_3$ |
| Sample 1 of the present invention | $Li_{1.05}Mn_{1.95}O_{3.95}F_{0.05}$ | 24.689 g | 0.182 g | 0.129 g |
| Sample 2 of the present invention | $Li1_{1.02}Mn_{1.98}O_{3.98}F_{0.02}$ | 24.877 g | 0.072 g | 0.051 g |
| Sample 3 of the present invention | $Li_{1.1}Mn_{1.9}O_{3.9}F_{0.1}$ | 24.370 g | 0.368 g | 0.262 g |
| Sample 4 of the present invention | $Li_{1.15}Mn_{1.85}O_{3.85}F_{0.15}$ | 24.042 g | 0.559 g | 0.398 g |
| Sample 5 of the present invention | $Li_{1.2}Mn_{1.8}O_{3.8}F_{0.2}$ | 23.706 g | 0.756 g | 0.538 g |
| Sample 6 of the present invention | $Li_{1.05}Mn_{1.95}O_{3.98}F_{0.04}$ | 24.674 g | 0.145 g | 0.181 g |

TABLE 1-continued

| Sample No. | Composition | Compound amount of starting material | | |
|---|---|---|---|---|
| | | $LiMn_2O_4$ | LiF | $Li_2CO_3$ |
| Sample 7 of the present invention | $Li_{1.05}Mn_{1.95}O_{3.97}F_{0.03}$ | 24.659 g | 0.109 g | 0.233 g |
| Sample 8 of the present invention | $Li_{1.05}Mn_{1.95}O_{3.99}F_{0.01}$ | 24.628 g | 0.036 g | 0.335 g |
| Sample 9 of the present invention | $Li_{1.05}Mn_{1.95}O_{3.95}F_{0.04}$ | 24.674 g | 0.145 g | 0.181 g |
| Sample 10 of the present invention | $Li_{1.05}Mn_{1.95}O_{3.95}F_{0.03}$ | 24.659 g | 0.109 g | 0.233 g |
| Sample 11 of the present invention | $Li_{1.05}Mn_{1.95}O_{3.95}F_{0.01}$ | 24.628 g | 0.036 g | 0.335 g |
| Sample 12 of the present invention | $Li_{1.05}Mn_{1.95}O_{3.94}F_{0.05}$ | 24.689 g | 0.182 g | 0.129 g |
| Sample 13 of the present invention | $Li_{1.05}Mn_{1.95}O_{3.93}F_{0.05}$ | 24.689 g | 0.182 g | 0.129 g |
| Sample 14 of the present invention | $Li_{1.05}Mn_{1.95}O_{3.91}F_{0.05}$ | 24.689 g | 0.182 g | 0.129 g |
| Sample 15 of the present invention | $Li_{1.05}Mn_{1.95}O_{3.89}F_{0.05}$ | 24.689 g | 0.182 g | 0.129 g |
| Sample 16 of the present invention | $Li_{1.05}Mn_{1.95}O_{3.88}F_{0.05}$ | 24.689 g | 0.182 g | 0.129 g |
| Comparative Sample C1 | $Li_{1.05}Mn_{1.95}O_4$ | 24.613 g | 0 g | 0.387 g |
| Comparative Sample C2 | $Li_{1.05}Mn_{1.95}O_{3.95}$ | 24.613 g | 0 g | 0.367 g |

In the foregoing synthesis methods, lithium carbonate and lithium fluoride were used as starting materials. However, even if lithium nitrate, lithium acetate, lithium hydroxide or the like is used as a lithium source and ammonium fluoride or the like is used as a fluorine source, similar samples can be obtained.

These samples were evaluated for characteristics of positive electrode materials for secondary lithium battery. The samples used were Samples 1 to 11 of the present invention, Comparative Samples C1 and C2 and $LiMn_2O_4$ (Standard Sample S1), which had been used as a starting material.

The structure of the foregoing secondary lithium battery will be described hereinafter. As the positive electrode for the foregoing secondary lithium battery there was used a mixture of 90 wt-% of each of the various samples thus obtained and 10 wt-% of an electrically-conductive binder, such as a teflonized acetylene black. As the negative electrode for the foregoing secondary lithium battery there was used a sheet of a metallic lithium foil having a thickness of 0.4 mm. As the separator to be provided interposed between the positive electrode and the negative electrode there was used a nonwoven fabric of polypropylene. The electrolyte incorporated in the foregoing secondary lithium battery was a 1 normal solution of $LiPF_6$.

The solvent for this electrolyte was a 1:1 mixture of ethylene carbonate and diethyl carbonate.

The initial discharge characteristics of the foregoing secondary lithium battery and the charge/discharge conditions during the measurement of cycle characteristics of the battery will be described hereinafter. The various secondary lithium batteries were each charged to 4.5 V at a constant current of 1 mA/cm². After the charged voltage reached 4.5 V, the secondary lithium battery was then charged at a constant voltage of 4.5 V. The total charge time was 2 hours. Immediately after the termination of charge, discharge began. Discharge was effected at a constant current of 1 mA/cm². When the charged voltage reached 3.5 V, discharge was terminated. Charge was immediately effected again. These steps constitutes one cycle.

Figure 3:
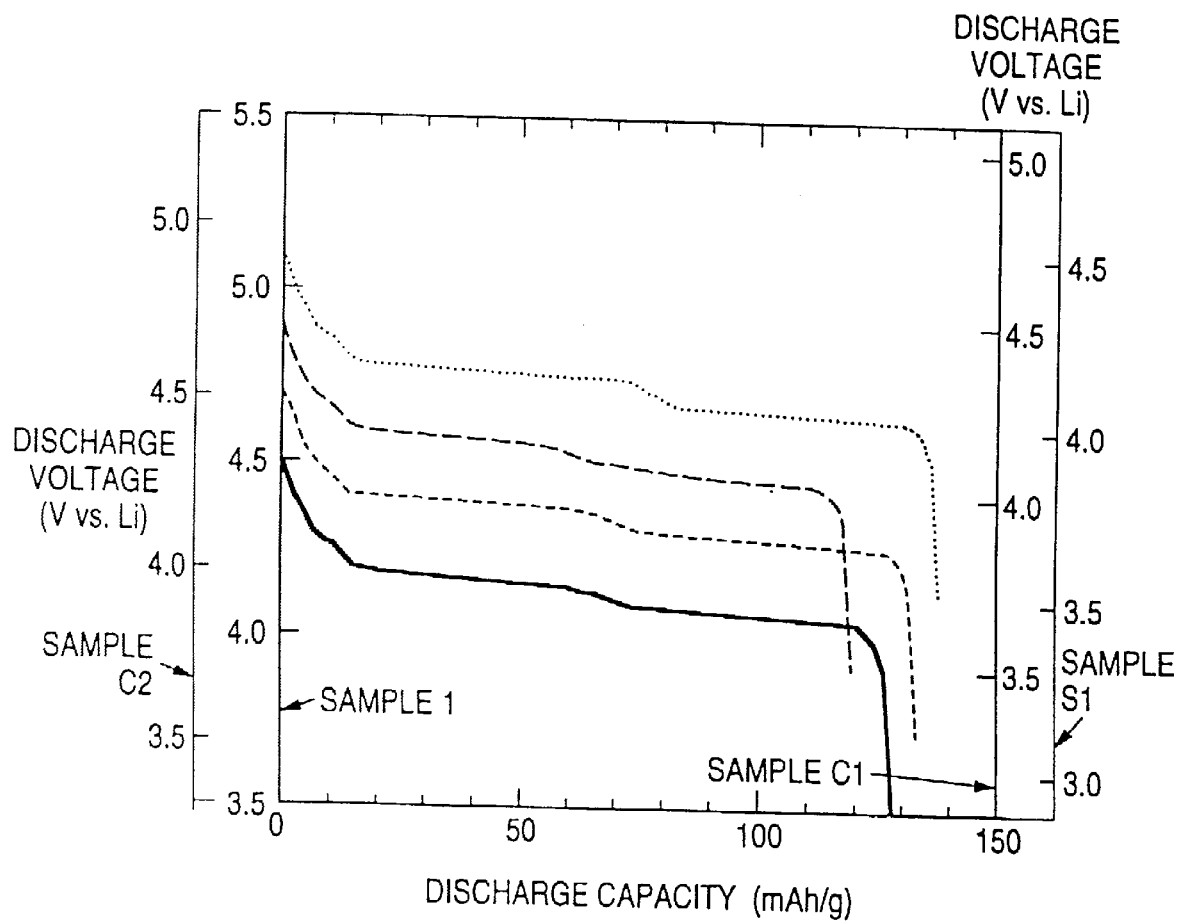
FIG. 3 is a graph illustrating the initial discharge characteristics at 20° C. of secondary lithium batteries comprising Sample 1 of the present invention, Comparative Samples C1 and C2 and Standard Sample S1 as a positive electrode material, respectively. For ease of comparison, the curves of Comparative Samples C2 and C1 and Standard Sample S1 are shown vertically shifted by 0.2 V, 0.4 V, and 0.6 V as the ordinate scale, respectively, to the curve of Sample 1 of the present invention.

FIG. 3 illustrates the initial discharge characteristics at 20° C. of the secondary lithium batteries comprising Sample 1 of the present invention, Comparative Samples C1 and C2 and Standard Sample S1 as a positive electrode, respectively. The comparison with Standard Sample S1 shows that the secondary lithium batteries comprising Sample 1 of the present invention and Comparative Samples C1 and C2, respectively, exhibit a drop of initial discharge capacity. Comparative Sample C1 showed a greatest drop of initial discharge capacity. Sample 1 of the present invention showed a second greatest drop of initial discharge. Comparative Sample C2 was last. The behavior of these samples were as expected in FIG. 1. For ease of comparison, the curves of Comparative Samples C2 and C1 and Standard Sample S1 are shown vertically shifted by 0.2 V, 0.4 V, and 0.6 V as the ordinate scale, respectively, to the curve of Sample 1 of the present invention.

Figure 4:
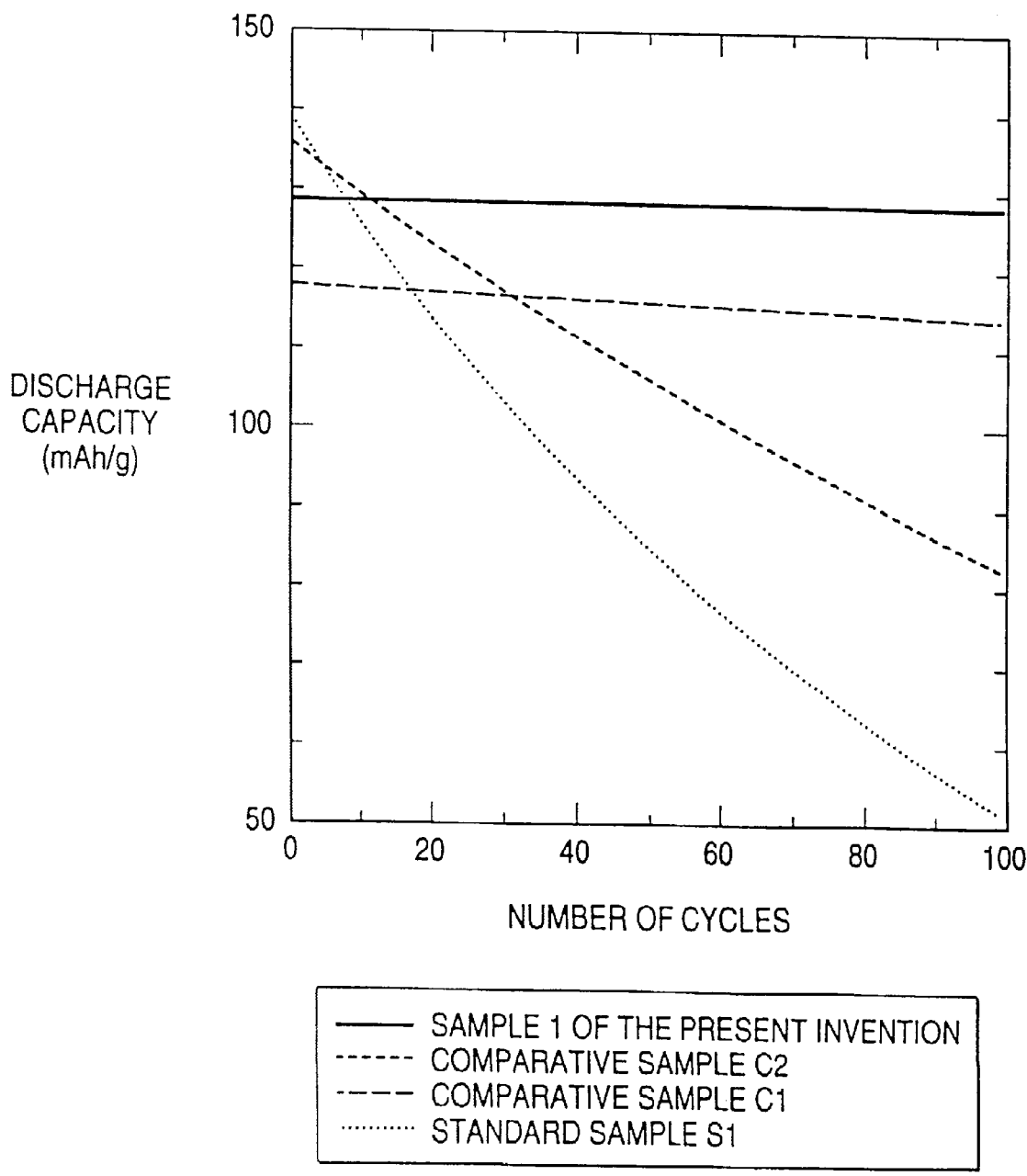
FIG. 4 is a graph illustrating the charge/discharge cycle characteristics at 20° C. of secondary lithium batteries comprising Sample 1 of the present invention, Comparative Samples C1 and C2 and Standard Sample S1 as a positive electrode, respectively.

FIG. 4 illustrates the discharge cycle characteristics at 20° C. of secondary lithium batteries comprising Sample 1 of the present invention, Comparative Samples C1 and C2 and Standard Sample S1 as a positive electrode, respectively. The numbers on the ordinate indicate the discharge capacity (mAh/g). The numbers on the abscissa indicate the number of repetition of charge/discharge, i.e., number of cycles. Standard Sample S1 exhibits a high initial discharge capacity but shows a rapid drop of discharge capacity after repetition of cycles.

Comparative Sample C1 shows a small discharge capacity drop after repetition of cycles but has a drastically reduced initial discharge capacity. On the other hand, the secondary lithium batteries comprising Sample 1 of the present invention and Comparative Sample C2, respectively, show an initial discharge capacity drop which is not so remarkable as C1. It can be seen in FIG. 4 that Sample 1 of the present invention exhibits a less discharge capacity drop particularly after repetition of charge/discharge.

Figure 5:
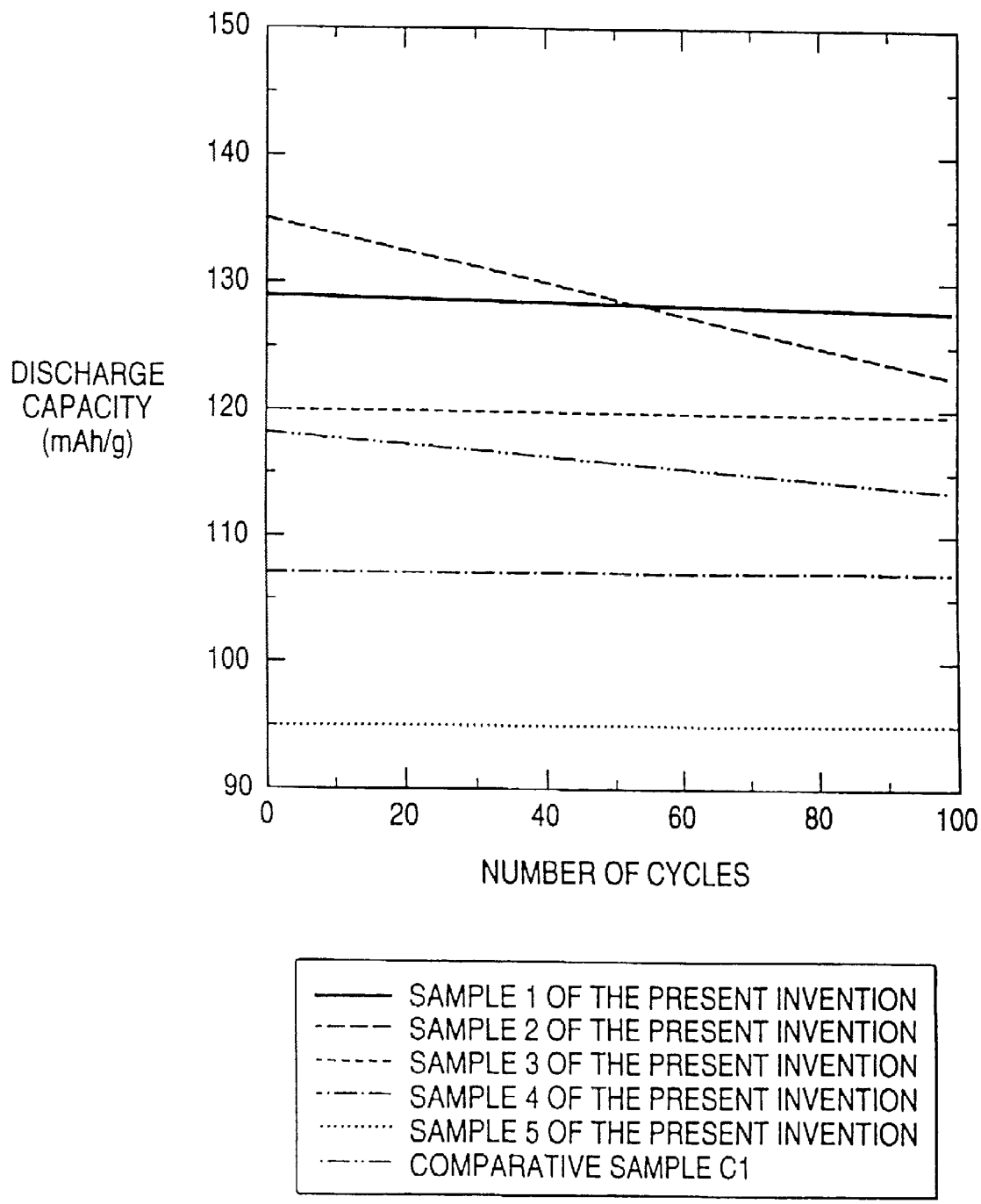
FIG. 5 is a graph illustrating the charge/discharge cycle characteristics at 20° C. of secondary lithium batteries comprising Samples 1 to 5 of the present invention and Comparative Sample C1 as a positive electrode, respectively.

In order to examine the effect of substitution of fluorine, the charge/discharge cycle characteristics at 20° C. of secondary lithium batteries comprising Samples 1 to 5 of the present invention and Comparative Sample C1 as a positive electrode, respectively, are shown in FIG. 5. Referring to $Li_{1.02}Mn_{1.98}O_{3.98}F_{0.02}$ as Sample 2 of the present invention, the amount of excess Li and the substitution of F are insufficient. As a result, the discharge capacity is reduced to about 90% of the initial discharge capacity after 100 cycles. However, Sample 2 of the present invention maintains a greater discharge capacity than Comparative Sample C1.

On the other hand, the amount of excess Li and the substitution of F increase in the order of $Li_{1.05}Mn_{1.95}O_{3.95}F_{0.05}$ as Sample 1 of the present invention, $Li_{1.1}Mn_{1.9}O_{3.9}F_{0.1}$ as Sample 3 of the present invention, $Li_{1.15}Mn_{1.85}O_{3.85}F_{0.15}$ as Sample 4 of the present invention and $Li_{1.2}Mn_{1.8}O_{3.8}F_{0.2}$ as Sample 5 of the present invention. It can be seen that as the amount of Li and the substitution of F increase, the initial discharge capacity is reduced, but the cycle characteristics are drastically improved. In particular, $Li_{1.15}Mn_{1.85}O_{3.85}F_{0.15}$ as Sample 4 of the present invention and $Li_{1.2}Mn_{1.8}O_{3.8}F_{0.2}$ as Sample 5 of the present invention exhibit a lower initial discharge capacity than Comparative Sample C1 but show little or no deterioration of discharge capacity.

Figure 6:
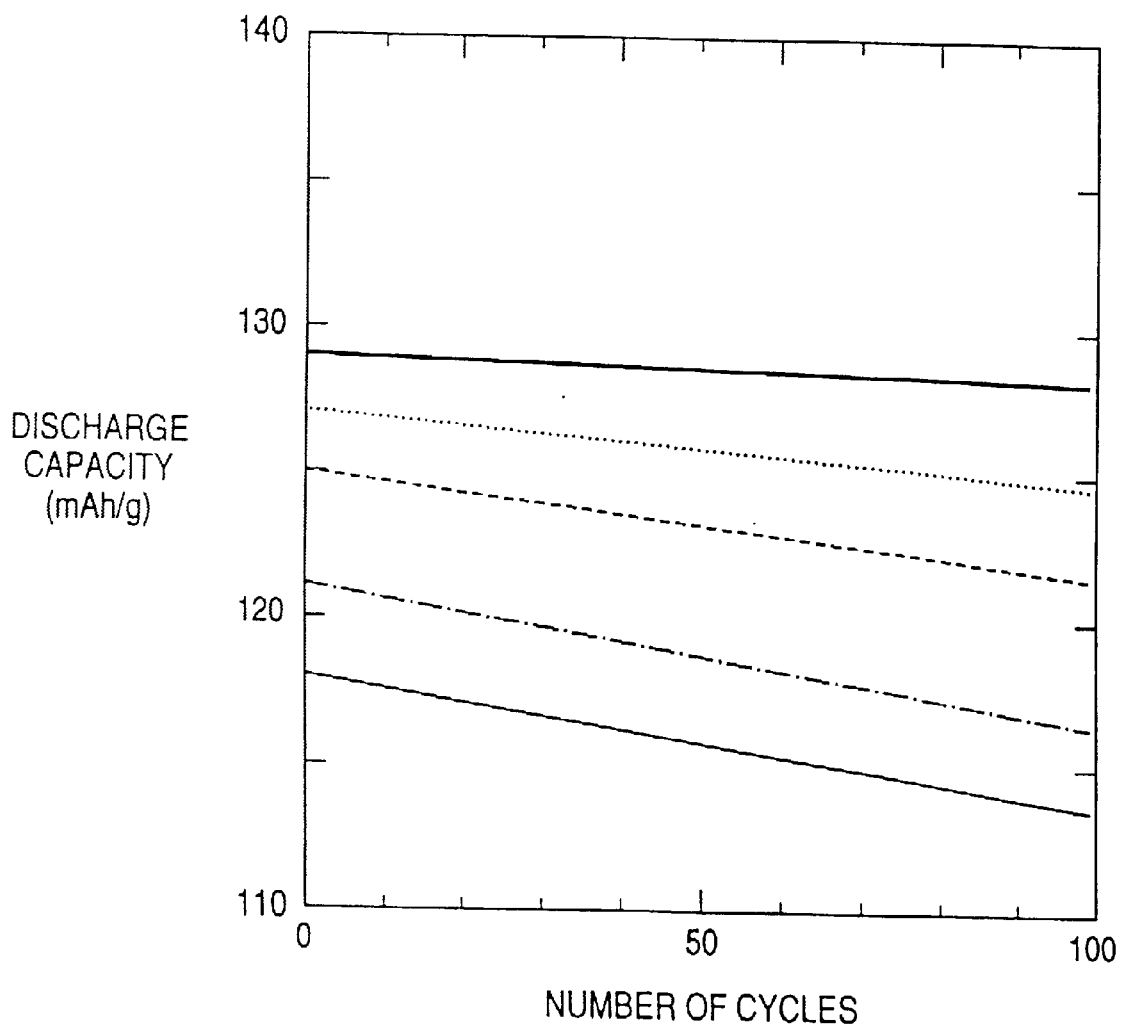
FIG. 6 is a graph illustrating the charge/discharge cycle characteristics at 20° C. of secondary lithium batteries comprising Samples 1 and 6 to 8 of the present invention and Comparative Sample C1 as a positive electrode, respectively.

With the composition ratio of Li to Mn kept constant and no deficiency of anion, the effect of substitution of fluorine was studied. As can be seen in FIGS. 3 to 5, Sample 1 of the present invention ($Li_{1.05}Mn_{1.95}O_{3.95}F_{0.05}$) attains both a high capacity and a high level cycle durability. Thus, with the cation ratio (Li: Mn=1.05: 1.95) and the total amount of anions (4−y+z=4) kept constant, samples having different amounts of substituents F (Samples 6 to 8 of the present invention) were synthesized. FIG. 6 illustrates the charge/ discharge cycle characteristics at 20° C. of secondary lithium batteries comprising Samples 1 and 6 to 8 of the present invention and Comparative Sample C1 as a positive electrode, respectively. The numbers on the ordinate indicate the discharge capacity (mAh/g). The numbers on the abscissa indicate the number of repetition of charge/ discharge, i.e., number of cycles.

Sample 1 of the present invention exhibits a high initial capacity and a small discharge capacity drop after repetition of cycles. The amount of fluorine decreases in the order of Samples 6, 7 and 8 of the present invention, and Comparative Sample C1. As the amount of fluorine decreases, the initial capacity decreases. However, the discharge capacity drop after repetition of charge/discharge remains much the same. In other words, it was made clear that the substitution of fluorine with no deficiency of anion makes it possible to attain both a high capacity and a good cycle durability.

Figure 7:
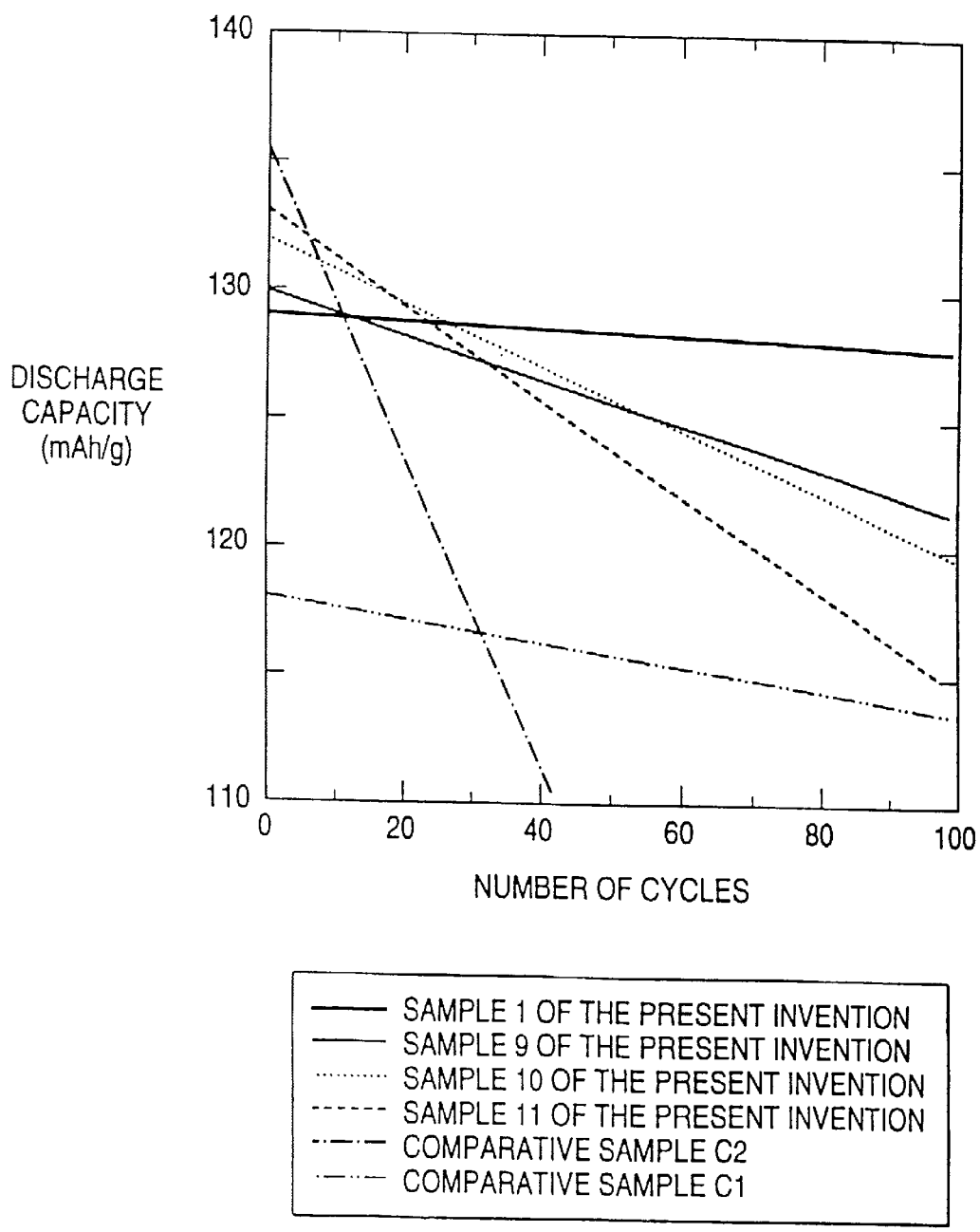
FIG. 7 is a graph illustrating the charge/discharge cycle characteristics at 20° C. of secondary lithium batteries comprising Samples 1 and 9 to 11 of the present invention and Comparative Samples C1 and C2 as a positive electrode, respectively.

With the composition ratio of Li to Mn and the amount of oxygen kept constant, the effect of substitution of fluorine was examined. In some detail, with the cation ratio (Li: Mn=1.05: 1.95) and the amount of oxygen (3.95) kept constant, samples having different amounts of substituents F (Samples 9 to 11 of the present invention) were synthesized. FIG. 7 illustrates the charge/discharge cycle characteristics at 20° C. of secondary lithium batteries comprising Samples 1 and 9 to 11 of the present invention and Comparative Samples C1 and C2 as a positive electrode, respectively. The numbers on the ordinate indicate the discharge capacity (mAh/g). The numbers on the abscissa indicate the number of repetition of charge/discharge, i.e., number of cycles.

Sample 1 of the present invention exhibits a high initial discharge capacity and a small capacity drop after repetition of cycles. The amount of fluorine decreases in the order of Samples 9, 10 and 11 and Comparative Example C1 with the amount of oxygen kept constant. As a result, the initial discharge capacity increases in sequence. However, the discharge capacity drop after repetition of charge/discharge becomes more remarkable with the decrease in the amount of fluorine.

In particular, Samples 1 and 4 to 6 of the present invention exhibit better cycle characteristics than Samples 9 to 11 of the present invention and Comparative Sample C1. This probably means that Samples 1 and 6 to 8 of the present invention, in which anion sites are completely filled, have a stable crystal structure than Samples 9 to 11 and Comparative Sample C1, in which there are defects at the anion sites.

Figure 8:
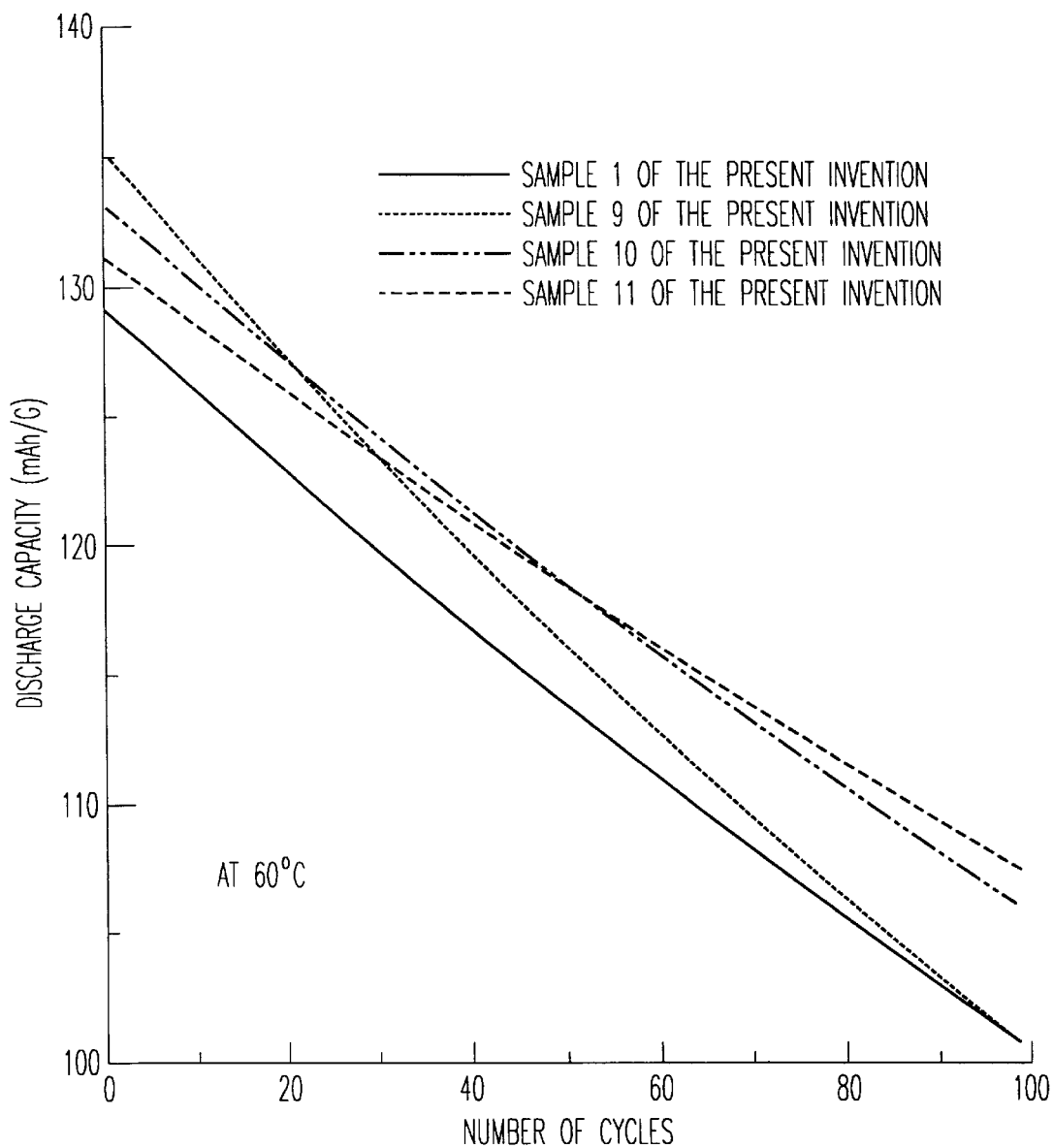
FIG. 8 is a graph illustrating the charge/discharge cycle characteristics at 60° C. of secondary lithium batteries comprising Samples 1 and 9 to 11 of the present invention as a positive electrode, respectively.

On the other hand, when the same cycle durability test was conducted at higher temperature, different results were obtained. FIG. 8 illustrates the charge/discharge cycle characteristics at 60° C. of secondary lithium batteries comprising Samples 1 and 9 to 11 of the present invention as a positive electrode, respectively. The numbers on the ordinate indicate the discharge capacity (mAh/g). The numbers on the abscissa indicate the number of repetition of is charge/ discharge, i.e., number of cycles. As is clear from FIG. 8, Samples 9 and 10 of the present invention having oxygen deficiency exhibit better performance than Sample 1 of the present invention having no oxygen deficiency. The deterioration in cycle durability performance at a high temperature is caused by the elution of Mn from the positive electrode. However, in this case, oxygen is also eluted from the positive electrode together with the elution of Mn (J. C. Hunter; *J. Solid State Chemistry,* 39, 142–147 (1981)). In this regard, the oxygen deficiency in a slight amount rather inhibits farther elution of oxygen, and as a result also inhibits the elution of Mn, and accordingly high-temperature cycle durability would be increased. Further, the substitution of F (represented by z) is preferably more than 0.01.

Figure 9:
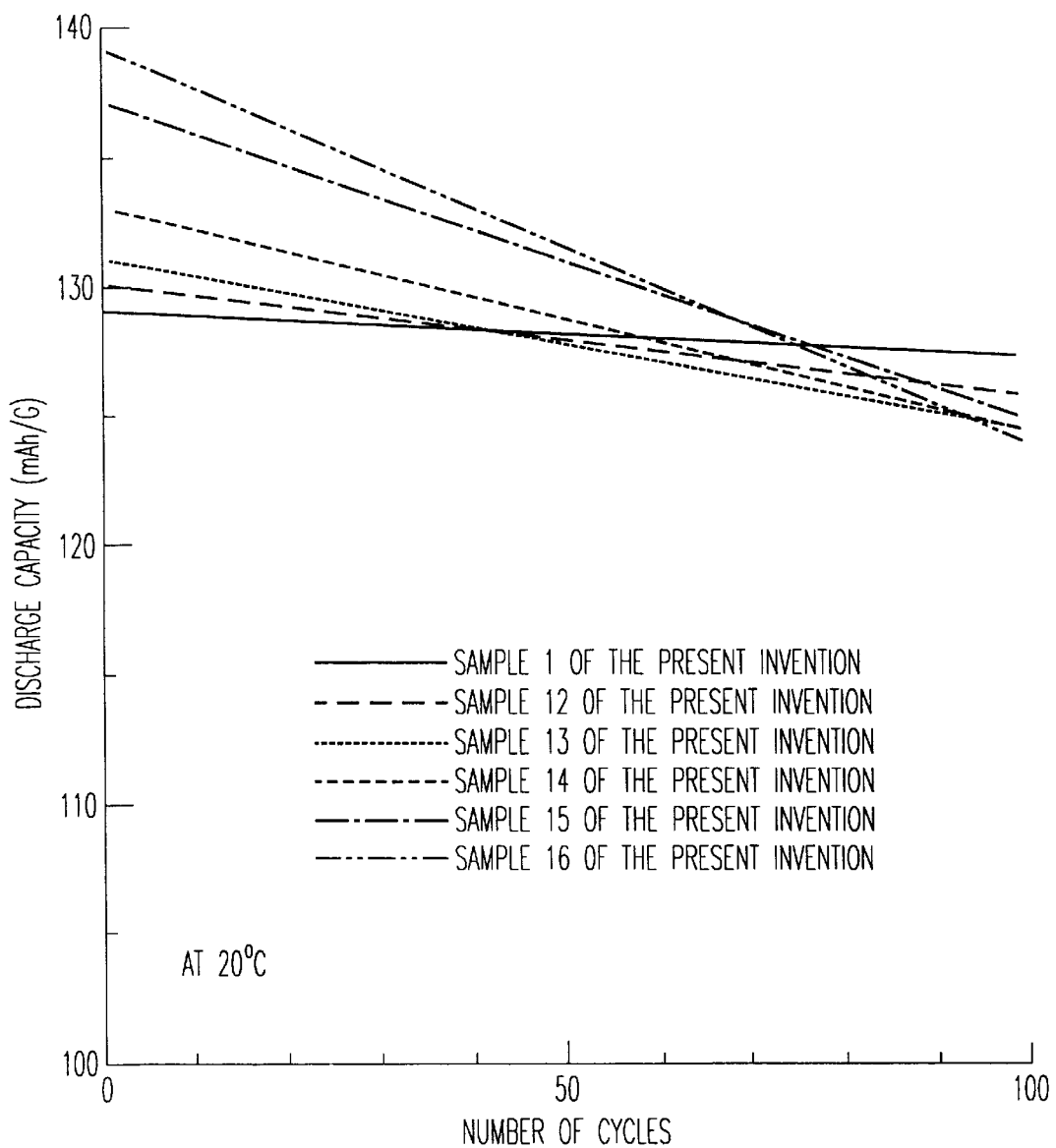
FIG. 9 is a graph illustrating the charge/discharge cycle characteristics at 20° C. of secondary lithium batteries comprising Samples 1 and 12 to 16 of the present invention as a positive electrode, respectively.

In order to examine the effect of oxygen deficiency, samples having different amounts of oxygen with the amount of substituents F kept constant were synthesized (Samples 12 to 16 of the present invention). FIG. 9 illustrates the charge/discharge cycle characteristics at 20° C. of secondary lithium batteries comprising Samples 1 and 12 to 16 of the present invention as a positive electrode, respectively. The numbers on the ordinate indicate the discharge capacity (mAh/g). The numbers on the abscissa indicate the number of repetition of charge/discharge, i.e., number of cycles. Similarly as in the case of FIG. 7, Sample 1 of the present invention having no oxygen deficiency exhibits most excellent performance.

Figure 10:
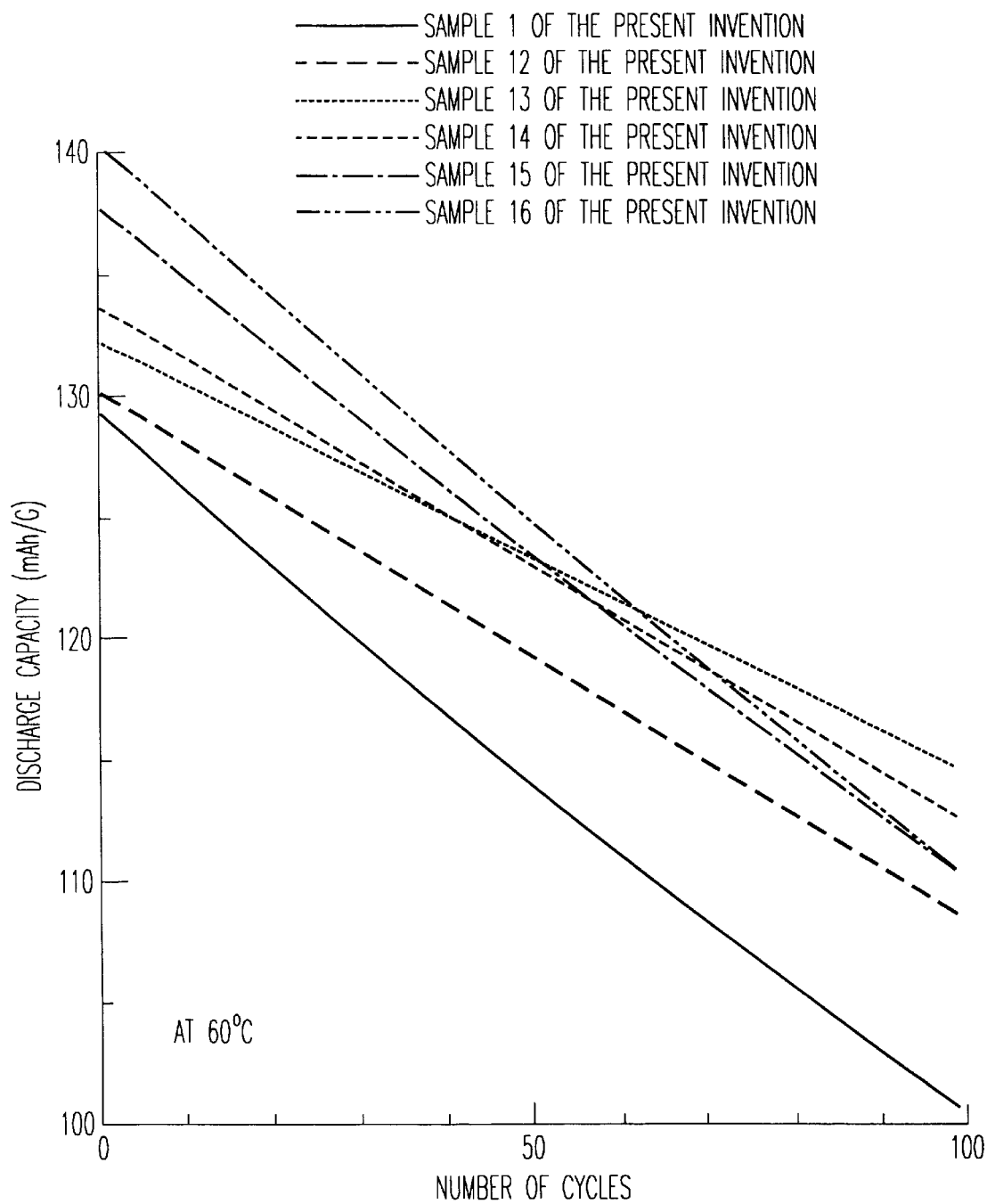
FIG. 10 is a graph illustrating the charge/discharge cycle characteristics at 60° C. of secondary lithium batteries comprising Samples 1 and 12 to 16 of the present invention as a positive electrode, respectively.

FIG. 10 illustrates the charge/discharge cycle characteristics at 60° C. of secondary lithium batteries comprising Samples 1 and 12 to 16 of the present invention as a positive electrode, respectively. The numbers on the ordinate indicate the discharge capacity (mAh/g). The numbers on the abscissa indicate the number of repetition of charge/ discharge, i.e., number of cycles. Unlike the case at 20° C., Samples 12 to 16 of the present invention having oxygen deficiency exhibit better performance than Sample 1 of the present invention having no oxygen deficiency. These results were the same as those shown in FIG. 8.

Figure 11:
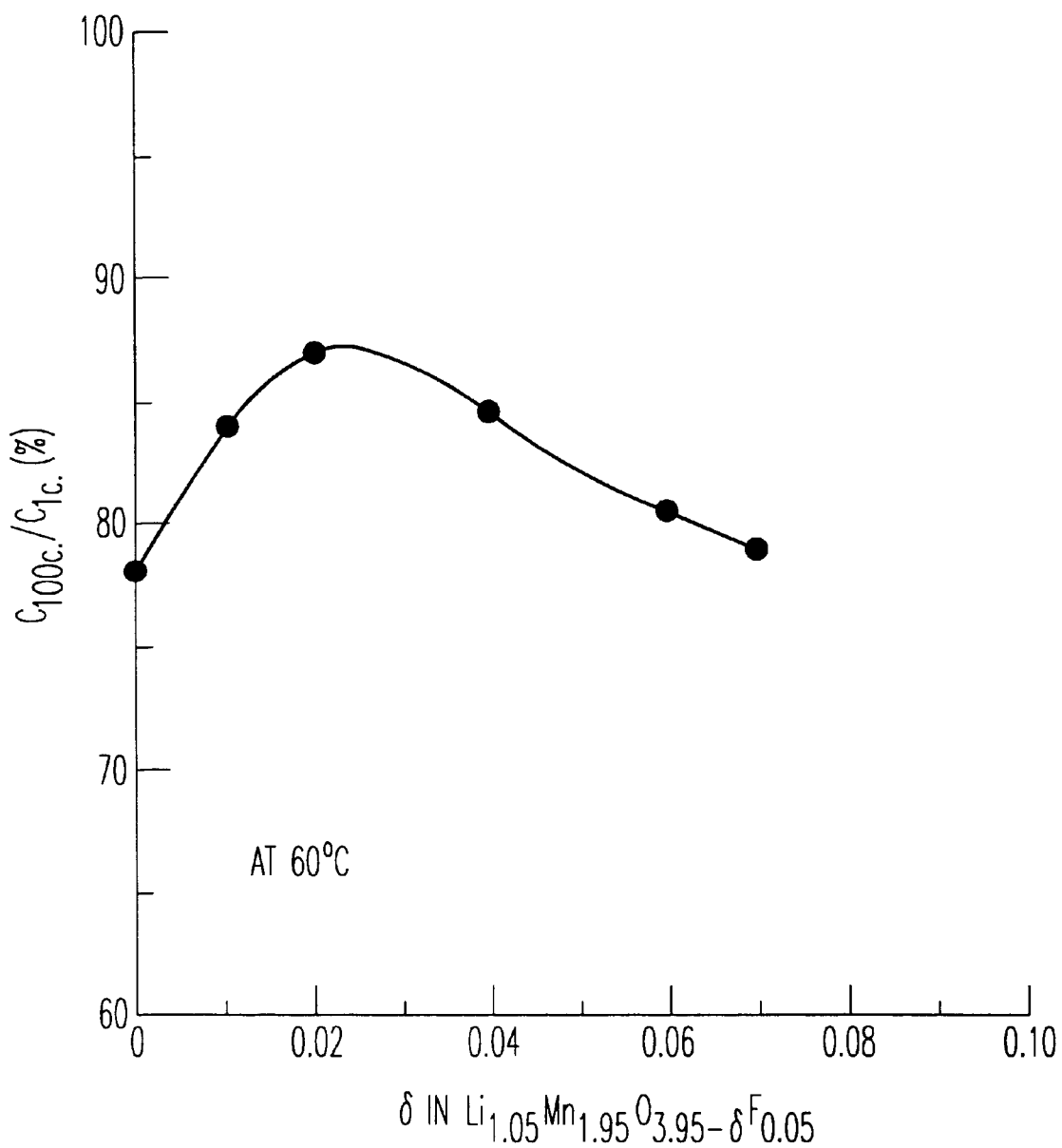
FIG. 11 is a graph illustrating the relationship between the ratio of the capacity after 100 cycles to the initial capacity and the amount of oxygen deficiency, δ (=y−z), at 60° C. of secondary lithium batteries comprising Samples 1 and 12 to 16 of the present invention as a positive electrode, respectively.

FIG. 11 illustrates the relationship between the amount of oxygen deficiency in Samples 1 and 12 to 16 of the present invention, $\delta$ (=y–z) and the ratio of the capacity after 100 cycles to the initial capacity at 60° C. The value of $\delta$ should be more than 0 and provides excellent results in a range of not more than 0.07, which could almost maintain a cubic spinel structure of the samples, and preferably is from 0.005 to 0.06, particularly from 0.01 to 0.04.

Further, all Samples 1 to 11 of the present invention and Comparative Samples C1 and C2 have a cubic spinel structure at room temperature. Excessive oxygen deficiency causes the crystal structure of samples from cubic to tetragonal symmetry even at room temperature. When such a change in the crystal structure occurs, the resulting charge/ discharge voltage is reduced. Therefore, the positive electrode material preferably has a cubic spinel structure within the battery operating temperature range or even at room temperature.

Summarizing the foregoing results, the substitution of Li for the Mn sites in a lithium manganate-based material having a spinel structure represented by the composition formula $LiMnO_4$ provides improvement in charge/discharge cycle characteristics but causes a drop of initial discharge capacity. It was confirmed that although the provision of oxygen deficiency in the crystal lattice is effective for the prevention of this drop of initial discharge capacity, the introduction of fluorine (F) into the site of oxygen defects provides further improvement in charge/discharge cycle characteristics that gives a most practical material.

While the invention has been described in detail and with reference to specific embodiments thereof, it should not be limited thereto. Various changes and modifications can be made therein without departing from the spirit and scope thereof. For example, in the foregoing examples, the introduction of fluorine (F) into the crystal lattice is accomplished by the partial substitution of fluorine atoms for oxygen atoms in the crystal lattice. Of course, instead of this method, fluorine may be introduced into some or all of the sites of oxygen defects which have previously been provided in the crystal lattice.

In the foregoing examples, both the substitution of excess Li for the Mn sites and the introduction of fluorine into the crystal lattice are simultaneously accomplished by the use of lithium fluoride (LiF). Instead of this method, the two operations may be separately effected. By doing so, the substitution of Li and the introduction of F can each be determined to a proper value, making it possible to further improve the initial discharge capacity and charge/discharge cycle characteristics.

As mentioned above, the present invention can be applied for the cathode material of lithium secondary batteries using a nonaqueous electrolyte. For such batteries, an anode material and a nonaqueous electrolyte are not limited as long as usual materials for lithium secondary batteries are used. A metal of lithium could be an anode, but materials that allow Li ions to be intercalated/deintercalated, e.g., graphite and coke are appropriate for an anode. On the other hand, the nonaqueous electrolyte consists of an organic solvent and a lithium salt. For such an organic solvent, the mixture of ethylene carbonate and diethyl carbonate is available, and as a lithium salt $LiPF_6$ is available. Further examples of the organic solvent are γ-butyl lactone and propylene carbonate, and those of the lithium salt are $LiBF_4$ and $LiClO_4$.

The positive electrode material for a secondary lithium battery of the present invention has lithium ions introduced into the manganese sites in a lithium-manganese oxide having a spinel structure to exhibit improved charge/discharge cycle characteristics. The introduction of lithium ions could cause a change in the valence of manganese ions and a drop of initial discharge capacity. But this defect can be prevented by the provision of oxygen deficiency in the crystal lattice. Further, the oxygen deficiency could weaken the crystal structure, but this is eliminated by the introduction of fluorine.

Accordingly, the positive electrode material for a secondary lithium battery of the present invention can provide a high initial charge/discharge capacity as well as stably maintained spinel structure to make a contribution to improvement in charge/discharge cycle characteristics, i.e., cycle durability. The positive electrode material for a secondary lithium battery of the present invention can be applied to a secondary lithium battery for personal computer or communication apparatus such as portable telephone, which is expected to be spread in the future, or a secondary lithium battery as power supply for electric automobile, is which is expected to be in great demand in the future. Thus, the positive electrode material for a secondary lithium battery of the present invention can fully meet the demand for high energy density and long life.

What is claimed is:

1. A positive electrode material for a secondary lithium battery excellent in high temperature cycle characteristics, comprising a spinel structure of a lithium manganese oxyfluoride having the formula:

$$Li_{1+x}Mn_{2-x}O_{4-y}F_z$$

wherein x represents a number of from 0.0133 to 0.3333; y represents a number of from 0 to 0.2 (exclusive of 0); and z represents a number of from 0.01 to 0.2 (exclusive of 0.01), with the proviso that (y−z) is more than 0 but not more than 0.07.

2. The positive electrode material for a secondary lithium battery according to claim 1, wherein (y−z) is from 0.005 to 0.06.

3. The positive electrode material for a secondary lithium battery according to claim 1, wherein (y−z) is from 0.01 to 0.04.

4. The positive electrode material for a secondary lithium battery according to claim 1, wherein x is not less than 0.03.

5. A nonaqueous electrolytic battery, comprising a carbon material as a negative electrode, a lithium manganese oxyfluoride having the formula according to claim 1 as a positive electrode and a nonaqueous electrolyte for battery.

6. A process for manufacturing a lithium manganese oxyfluoride, comprising the steps of:

mixing a $LiMn_2O_4$ powder; a lithium compound powder and a fluorine compound powder and molding a mixture; and calcining the molded mixture.

7. A process for manufacturing a lithium manganese oxyfluoride according to claim 6, wherein the lithium compound is at least one selected from the group consisting of $Li_2CO_3$, $LiNO_3$, $CH_3COOLi$, LiOH and LiF.

8. A process for manufacturing a lithium manganese oxyfluoride according to claim 6, wherein the fluorine compound is at least one selected from the group consisting of LiF and $(NH_4)F$.

9. A process for manufacturing a lithium manganese oxyfluoride according to claim 6, wherein the lithium compound and the fluorine compound are LiF.

10. A process for manufacturing a lithium manganese oxyfluoride according to claim 6, wherein the calcining step is carried out under an atmosphere containing oxygen.

11. A process for manufacturing a lithium manganese oxyfluoride according to claim 10, wherein the atmosphere containing oxygen is an Ar gas containing 10% to 20% oxygen gas against the total volume of gases.

12. A process for manufacturing a lithium manganese oxyfluoride according to claim 6, wherein the calcining step is carried out at 650° C.

* * * * *